US 6,654,198 B2

(12) United States Patent
Liu et al.

(10) Patent No.: US 6,654,198 B2
(45) Date of Patent: Nov. 25, 2003

(54) REPEATABLE RUN-OUT ERROR COMPENSATION METHOD FOR A DISC DRIVE

(75) Inventors: Xiong Liu, Singapore (SG); Kian Keong Ooi, Singapore (SG); ChoonKiat Lim, Singapore (SG); Yangquan Chen, Singapore (SG); Qiang Bi, Singapore (SG); Mingzhong Ding, Singapore (SG); ShuangQuan Min, Singapore (SG); WeiSung Lee, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 262 days.

(21) Appl. No.: 09/885,008

(22) Filed: Jun. 19, 2001

(65) Prior Publication Data

US 2002/0039248 A1 Apr. 4, 2002

Related U.S. Application Data

(60) Provisional application No. 60/235,610, filed on Sep. 27, 2000, and provisional application No. 60/227,619, filed on Aug. 23, 2000.

(51) Int. Cl.[7] .............................................. G11B 5/596
(52) U.S. Cl. ............................. 360/77.04; 360/77.08; 360/78.09; 360/78.14
(58) Field of Search .......................... 360/77.04, 77.08, 360/78.09, 78.14

(56) References Cited

U.S. PATENT DOCUMENTS

| | | |
|---|---|---|
| 4,616,276 A | 10/1986 | Workman |
| 5,072,318 A | 12/1991 | Yu |
| 5,365,458 A * | 11/1994 | Tamura et al. ............... 364/506 |
| 5,402,280 A | 3/1995 | Supino |
| 5,539,714 A | 7/1996 | Andrews, Jr. et al. |
| 5,585,976 A | 12/1996 | Pham |
| 5,793,559 A | 8/1998 | Shepherd et al. |
| 5,867,342 A | 2/1999 | Hattori |
| 5,886,846 A | 3/1999 | Pham et al. |
| 5,909,661 A | 6/1999 | Abramovitch et al. |
| 5,923,491 A | 7/1999 | Kisaka et al. |
| 5,949,605 A | 9/1999 | Lee et al. |
| 5,978,169 A | 11/1999 | Woods |
| 5,995,316 A | 11/1999 | Stich |
| 5,999,357 A | 12/1999 | Serrano |
| 6,005,742 A | 12/1999 | Cunningham et al. |
| 6,069,764 A | 5/2000 | Morris et al. |
| 6,141,175 A | 10/2000 | Nazarian et al. |
| 6,421,198 B1 * | 7/2002 | Lamberts et al. ........ 360/77.04 |

OTHER PUBLICATIONS

Marc Bodson, Alexei Sacks and Pradeep Khosia; "Harmonic Generation in Adaptive Feedforward Cancellation Schemes"; *IEEE Transactions on Automatic Control*; Sep., 1994; pp. 1939–1944; vol. 39, No. 9; IEEE; Pittsburg, PA, US.

* cited by examiner

Primary Examiner—David Hudspeth
Assistant Examiner—Mitchell Slavitt
(74) Attorney, Agent, or Firm—Fellers, Snider, et al.

(57) ABSTRACT

Steps for isolating and correcting total written-in repeatable run-out error written into servo sectors of a disc drive include, determining a total repeatable run-out error value for each servo sector, isolating a repeatable error value component of the total written-in repeatable run-out error value for each servo sector, removing the repeatable error value component from total written-in repeatable run-out error value to provide a non-repeatable error value component of the total written-in repeatable run-out error value for each servo sector, providing both the repeatable and non-repeatable error value components to a processor for generation of compensation signals, and applying the compensation signals into a servo control circuit of control loop of the disc drive using compensation circuits to compensate for each component of the total written-in repeatable run-out error.

16 Claims, 6 Drawing Sheets

REPEATABLE RUN-OUT ERROR COMPENSATION METHOD FOR A DISC DRIVE

RELATED APPLICATIONS

This application claims priority to U.S. Provisional Application No. 60/227,619 filed Aug. 23, 2000, entitled Method To Improve The Compensation For Write-In Error In A Hard Disk Drive, and to U.S. Provisional Application No. 60/235,610, filed Sep. 27, 2000, entitled A Hybrid Scheme For Written-In RRO (Repeatable Runout) Compensation With Adjustable Track-Squeeze Improvement.

FIELD OF THE INVENTION

This invention relates generally to the field of magnetic data storage devices, and more particularly, but not by way of limitation, to incorporation of a method for compensating both cross-track repeatable written-in repeatable run-out error and cross-track non-repeatable written-in repeatable run-out error of a disc drive.

BACKGROUND

Disc drives are used for data storage in modern electronic products ranging from digital cameras to computers and network systems. Typically, disc drive includes a mechanical portion, or head disc assembly (HDA), and electronics in the form of a printed circuit board assembly (PCB), mounted to an outer surface of the HDA. The PCB controls HDA functions and provides a communication interface between the disc drive and a host being serviced by the disc drive.

Typically, a HDA includes a magnetic disc surface affixed to a spindle motor assembly for rotation at a constant speed and an actuator assembly positionably controlled by a closed loop servo system. The actuator assembly supports a read/write head that traverse generally concentric magnetic tracks radially spaced across the disc surfaces. Disc drives using magneto resistive heads typically use an inductive element to write data to the tracks in the form of magnetic flux transitions and a magneto resistive element to read data, such as servo data, from the track during drive operations. Servo data are typically written to the track during the manufacturing process by a servo track writer and are used by the closed loop servo system for controlling read/write head position during drive operations.

Continued demand for disc drives with ever-increasing levels of data storage capacity, faster data throughput and decreasing price per megabyte have led disc drive manufacturers to seek ways to increase the storage capacity and improve overall operating efficiencies of the disc drive. Present generation disc drives typically achieve aerial bit densities of multiple gigabits per square centimeter, Gbits/$cm^2$. Increasing aerial bit densities can be achieved by increasing the number of bits stored along each track or bits per inch (BPI), generally requiring improvements in the read/write channel electronics, and/or by increasing the number of tracks per unit width or tracks per inch (TPI), generally requiring improvements in servo control systems.

An approach taken by disc drive manufacturers to improve servo control systems has been through the introduction of methods for compensating repeatable run out error (RRO). RRO error is introduced into a servo burst of the disc drive during a servo write process. RRO error negatively impacts the alignment of the read/write head relative to track center of the data track by causing the data track formed during the servo write process to be an irregular, generally circular shape rather than a desired substantially perfect circle. Through incorporation of appropriate correction factors, the original irregular, generally circular shaped data track becomes a substantially perfect circle.

One such construction of RRO error compensation recently proposed in the art is exemplified by U.S. Pat. No. 6,069,764 issued to Morris et al. The Morris solution incorporates a transformation of a sequence of time domain repeatable run-out values into a sequence of frequency-domain repeatable run-out values, dividing the frequency-domain repeatable run-out values by measured transfer functions of the servo system at selected frequencies, then inverse transforms the frequency-domain sequences of compensation values to produce a sequence of time domain compensation values and injects the time domain sequence of compensation values into the servo loop to compensate for the RRO error. The basic method used to compensate RRO error is referred to as Zero Acceleration Path (ZAP). ZAP uses a position error signal (PES) generated from a servo burst written on the data track during the servo write process to determine the real RRO error and generate correction factors. However, the existing method to determine the RRO error is insufficiently accurate to meet the demands of ever-increasing TPI requirements with shrinking total measurable run-out (TMR) budgets, since current methods cannot separate cross-track repeatable written-in repeatable run-out error (CTR-WIRRO) and cross-track non-repeatable written-in repeatable run-out error (CTNR-WIRRO) components of the total RRO error. CTR-WIRRO derives from physical or mechanical events such as disc slip and vibration emanating from spindle imbalance. Large CTR-WIRRO error is beyond capabilities of ZAP and reduces the efficiency for written-in RRO error compensation. Also, CTNR-WIRRO error is the primary component of the total RRO error that contributes directly to write-to-read and write-to-write track mis-registration. As track densities continue to increase and design budgets for (TMR) decrease, challenges remain and a need persists for improved techniques of dealing with a wider spectrum of repeatable error components contributing to a total position error signal to assure a reduction in write-to-write and write-to-read mis-registration to improve data integrity of information recorded on adjacent tracks of the disc of the disc drive.

SUMMARY OF THE INVENTION

The present invention provides a method and apparatus for isolating and correcting cross track repeatable and cross track non-repeatable written-in repeatable run-out error components of a total written-in repeatable runout error of a disc drive through a determination of the total written-in repeatable run-out error written-in to a servo sector of a data track of a rotatable disc surface of the disc drive, isolating the cross track repeatable written-in repeatable run-out error component of the total written-in repeatable run-out error, removing the cross track repeatable error component from the total written repeatable run-out error to provide a cross track non-repeatable written-in repeatable run-out error component of the total written-in repeatable run-out error and providing both the repeatable and non-repeatable error value components to a processor.

The processor provides providing a cross track repeatable compensation signal, for application to a servo control circuit of a servo loop of the disc drive by a repeatable run-out error compensation circuit to compensate the cross track repeatable written-in repeatable run-out error component of the total written-in repeatable run-out error.

The processor also provides a cross track non-repeatable compensation signal, for application to the servo control circuit of the servo loop of the disc drive by a non-repeatable run-out error compensation circuit to compensate the cross track non-repeatable written-in repeatable run-out error component of the total written-in repeatable run-out error.

These and various other features and advantages which characterize the present invention will be apparent from a reading of the following detailed description and a review of the associated drawings.

DETAILED DESCRIPTION

Figure 1:
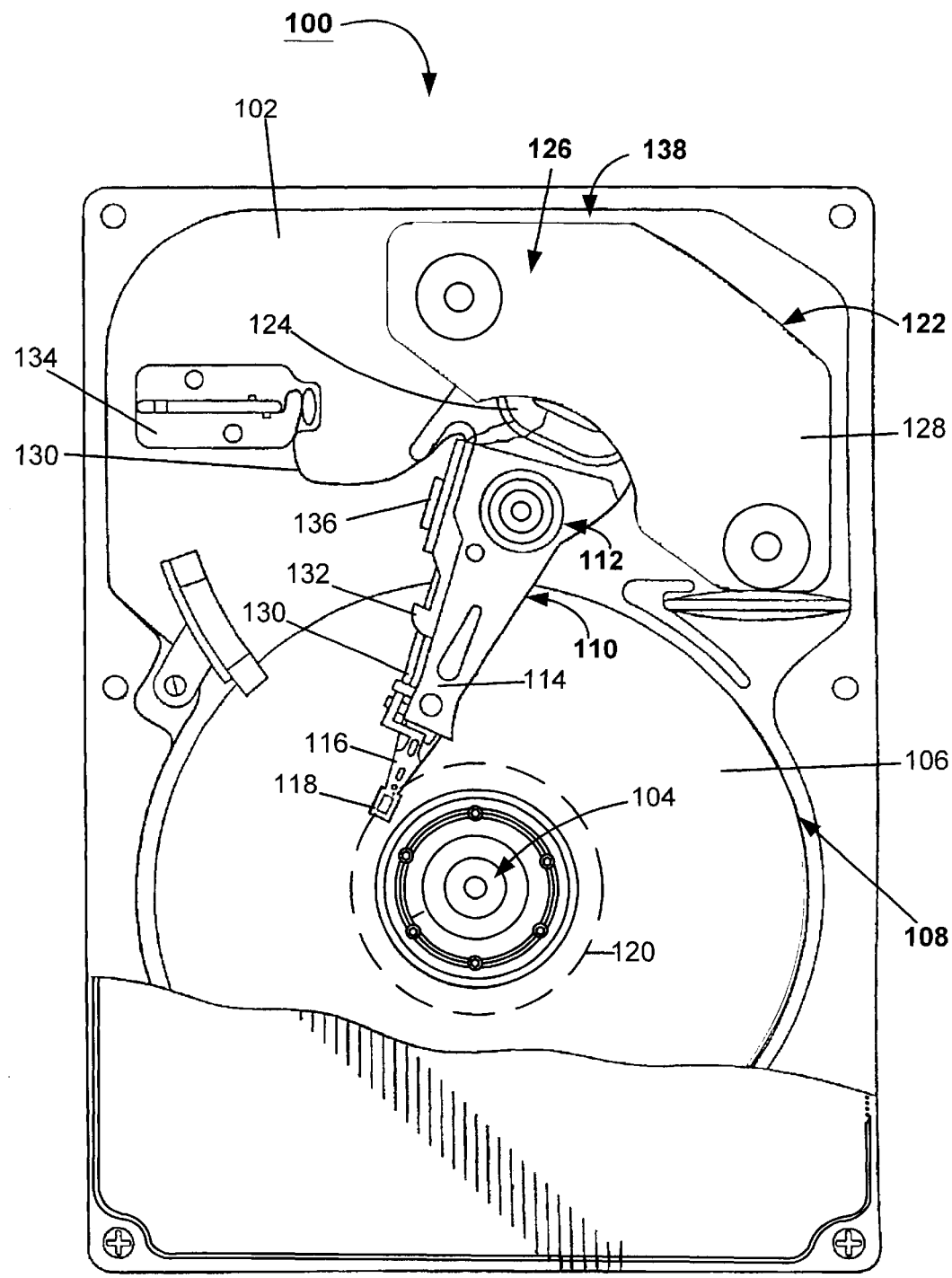
FIG. 1 is a top plan view of a disc drive incorporating compensation for written-in RRO error components of a position error signal of the disc drive in accordance with a method of the present invention.

Referring to the drawings in general, and more particularly to FIG. 1, shown therein is a top view of a disc drive 100 constructed in accordance with the present invention. Numerous details of and variations for the construction of the disc drive 100 are not included in the following description, as such are well-known to those skilled in the art and are believed to be unnecessary for the purpose of describing the present invention.

The disc drive 100 includes a basedeck 102 supporting various disc drive components, including a spindle motor assembly 104. The spindle motor assembly 104 supports at least one axially aligned rotatable disc surface 106 forming a disc stack 108 (also referred to as a "disc pack"). Adjacent the disc stack 108 is a dual actuator assembly 110 (also referred to as an "E-block" or a head stack assembly (HSA)), which pivots about a primary actuator motor support 112 (also referred to as a "bearing assembly") in a rotary fashion. The HSA 110 includes at least one actuator arm 114 that supports a load arm 116. Each load arm 116 in turn supports at least one read/write head 118 (also referred as head(s) 118) that correspond to each rotatable disc surface 106. Each rotatable disc surface 106 is divided into concentric circular data tracks 120 (only one shown) over which the read/write heads 118 are positionably located, and on which head position control information are written to embedded servo sectors (not separately shown). The embedded servo sectors separate a plurality of data sectors (not separately shown) for use by customers to store data.

The HSA 110 is controllably positioned by a primary actuator motor 122 (also referred to as a "voice coil motor assembly" (VCM)), comprising an actuator coil 124 immersed in the magnetic field generated by a magnet assembly 126. A magnetically permeable flux path is provided by a steel plate 128 (also called a top pole piece) mounted above the actuator coil 124 to complete the magnetic circuit of the VCM 122. During operation of the disc drive 100, current is passed through the actuator coil 124 and an electromagnetic field is setup, which interacts with the magnetic circuit of the VCM 122 to cause the actuator coil 124 to move relative to the magnet assembly 126 in accordance with the well-known Lorentz relationship. As the actuator coil 124 moves, the HSA 110 pivots about the bearing assembly 112 (also referred to as a primary actuator motor support), causing the heads 118 to move over the surfaces of the discs 106, thereby achieving a coarse positioning of the heads 118 adjacent a selected data track 120 of the disc surfaces 106.

To attain fine position control of the heads 118 relative to the selected data track 120, the HSA 110 further includes a micro-actuator 130 (also referred to as a secondary actuator motor) supported by the load arm 116. In a preferred embodiment the micro-actuator 130 includes a bipolar piezoelectric transducer (not separately shown) that responds to positive voltage inputs by expanding in a predetermined direction, while contracting in the predetermined direction to application of a negative voltage. As the micro-actuator 130 is affixed to the load arm 116 of the HSA 110, changes in mechanical position of the micro-actuator 130 relative to the selected data track 120 results in changes in mechanical position of the read/write head 118 relative to the selected data track 120, thereby facilitating fine position control of the read/write head 118 relative to the selected data track 120.

To provide the requisite electrical conduction paths between the read/write heads 118 and disc drive read/write circuitry (not shown), read/write head conductors (not separately shown) are affixed to a read/write flex circuit 132. Next, the read/write flex circuit 132 is routed from the load arms 116 along the actuator arms 114 and into a flex circuit containment channel (not separately shown), then on to a flex connector body 134. The flex connector body 134 supports the read/write flex circuit 132 during passage of the read/write flex circuit 132 through the basedeck 102 and into electrical communication with a disc drive printed circuit board assembly (PCB) (not shown) mounted to the underside of the basedeck 102. The read/write flex circuit 132 also supports read/write signal circuitry, including preamplifier/driver (preamp) 136 used to condition read/write signals passed between the read/write circuitry (not shown) and the read/write heads 118. The PCB of the disc drive supports read/write circuitry, which controls the operation of the heads 118, as well as other interface and control circuitry for the disc drive 100. It will be understood, drivers can be alternatively configured to output analog control signals to the VCM 122 and the micro-actuator 130 in response to digital input values.

Positional control of the read/write head 118 relative to the rotatable disc surface 106 during seek operations and a selected data track 120 during data transfer operations is directed by servo control electronics (not shown) communicating with a positioning mechanism 138. The positioning mechanism 138 includes the HSA 110 and the VCM 122. The VCM 122 responds to a position control signal, provided by the servo control electronics, by positioning the read/write head 118 relative to a selected data track 120. The read/write head 118 reads servo control information (not separately shown) of the selected data track 120 and provides a head measurement signal (not shown) that is combined with a reference signal (not shown) provided by the PCB to form a position error signal, which the servo control electronics uses to provide an updated position control signal, thereby completing a control loop. The control loop is active throughout all operations of the disc drive 100.

Figure 2:
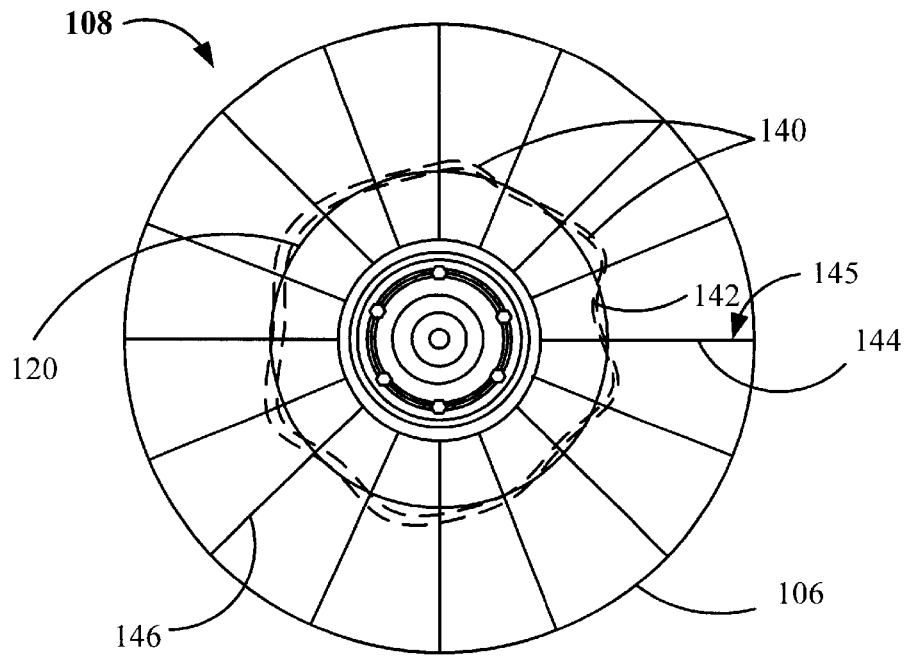
FIG. 2 is a top view of a section of a disc of FIG. 1 showing an ideal track and realized written-in track.

FIG. 2 is a top view of disc stack 108 showing rotatable disc surface 106 with an irregular, generally circular shape servo written data track 140 (shown as dashed lines and also referred to as servo track 140), a region 142 where adjacent servo tracks 140 are in very close proximity causing "AC track squeeze," a phenomenon described hereunder, and the desired substantially circular data track 120. Rotatable disc surface 106 includes a plurality of adjacent, radially extending servo sectors such as servo sectors 144 that form a servo wedge 145. Each servo sector 144 includes track identification bits 146 (not separately shown) and servo position bits 148 (not separately shown). The track identification bits 146 define the specific data track 120 accessed by a selected head from a plurality of data tracks 120. The servo position bits 148 are read and used to determine the location of the selected head 118 relative to a track center at the servo sector 144 of the selected servo track 140. Any variation in the position of the head 118 away from circular track 120 is considered the position error.

The portions of servo track 140 that do not comply with data track 120 results from disturbances occurring during the servo write process. Servo write process disturbances can shift the head 118 away from a desired position relative to the rotatable disc surface 106 or they can cause a shift in the rotatable disc surface 106 away from the desired position relative to the head 118. Occurrence of either, or both, results in written-in RRO position errors. With servo sectors 140 in place, when the disc drive 100 is directed to execute a data transfer operation, the disc drive 100 directs the positioning mechanism 138 to move the head 118 to a selected servo track 140 that contains track identification bits 146 that identify the correct data track 120 for the data transfer operation.

Position errors are considered RRO errors if the disc drive 100 determines a position correction is needed each time the head 118 reads the servo position bits 148 of a servo sector 144 at a particular circumferential location of the selected data track 120. Absent correction, the disc drive 100 will write data to the selected servo track 140 containing the appropriate track identification bits 146. Each time the head 118 encounters a servo sector 144 of the selected servo track 140, a positional correction is made, resulting in a data track 120 having the irregular shape of servo track 140.

Under the present invention, a head 118 attempting to write to or read from servo track 140 will not follow servo track 140 but rather will more closely follow the substantially circular data track 120. This is accomplished using calibrated compensation signals that prevent the servo system from tracking the irregular shape of servo track 140.

Figure 3:
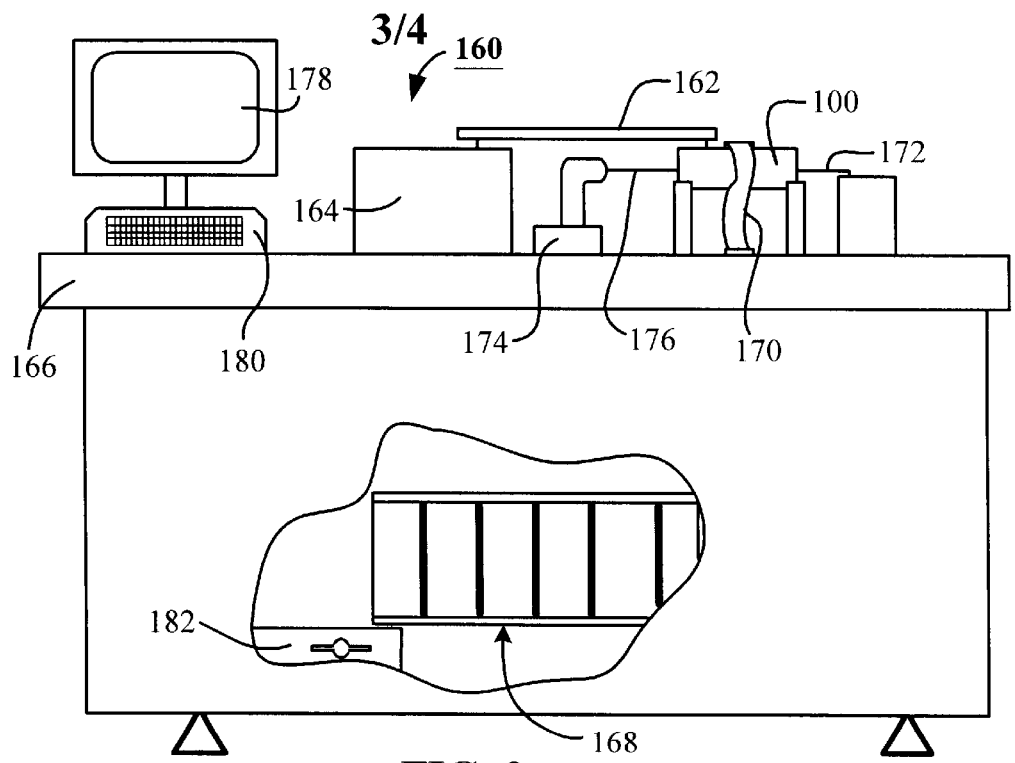
FIG. 3 shows an elevational view of a position information writing apparatus used in writing head position control information to data tracks of the disc drive of FIG. 1.

In an embedded servo system, the data tracks 120 are written by a position information-writing apparatus such as a servo track writer (STW) 160 as shown by FIG. 3. As recognized by those skilled in the art, the mechanical configurations of servo track writers vary to accommodate a particular disc drive and manufacturing processes selected to produce that particular disc drive. The mechanical presentation of STW 160 has been elected to add clarity and brevity in disclosing the subject matter of the invention. The elected structure is but one of multiple configurations in which numerous changes would readily suggest themselves to those skilled in the art, without changing the functionality of the STW 160.

Included in the STW 160 is a pushpin 162 connecting the HSA 110 of the disc drive 100 to a positioning apparatus 164 (also referred as positioner 164). The push-pin 162 structurally connects the HSA 110 to the positioner 164, which in turn controls movement of the HSA 110 during the process of writing the head position control information to the rotatable disc surface 106. During the servo track writing process, the disc drive 100 is supported by the STW support surface 166 of the STW 160. The disc drive 100 is connected to servo write control electronics 168 by servo write interface cable 170.

Once mounted and connected to the STW 160, a clock head 172 is positioned on the rotatable disc surface 106 to first, write a clock track on the rotatable disc surface 106 and second, to read the clock track during the servo write process to synchronize a write clock (not separately shown) of the control electronics 168 to the clock track. In addition to the clock head 172, a laser based measurement system 174, utilizing a laser beam 176, provides closed loop feedback to the servo write control electronics 168 for positioning the HSA 110, relative to the laser based measurement system 174, while each servo sector 144 is written to the rotatable disc surface 106.

Again, the STW 160 is designed to write data tracks 120 as concentric circles with each point of each specific circle substantially equidistant from the axis of rotation of the disc stack 108. Position errors occurring during the track writing process result in the process producing the irregularly shaped servo track 140. The written-in errors are written into the servo sectors 144 of servo track 140 and become written-in RRO errors that synchronize to the rotation of the rotatable disc surface 106 during operations of the disc drive 100.

Referring back to FIG. 2, disturbances occurring during the servo track writing process create written-in RRO errors within the servo tracks 140. The total written-in RRO error present within a selected servo track 140 has two components. A first component is cross track written-in repeatable run-out error [(CTR-WIRRO error) (also referred to herein as "repeatable error")], which derives from the occurrence of repeatable or synchronous disturbances sympathetic to the rotation of the rotatable disc surface 106 that occur during the servo track write process. Because the CTR-WIRRO errors are linked to the disc rotation, they are substantially similar track to track across the surface of the rotatable disc surface 106, hence the term "Cross Track Repeatable". The second component is cross track non-repeatable written-in repeatable run-out error [(CTNR-WIRRO error) (also referred to herein as "non-repeatable error")], which is a result from disturbances are not repeatable or synchronous disturbances sympathetic to the rotation of the rotatable disc surface 106 and are substantially dissimilar track to track across the surface of the rotatable disc surface 106, hence the term "Cross Track Non-repeatable".

The CTNR-WIRRO component of the total RRO error generates write-to-write and write-to-read track mis-registration by squeezing adjacent tracks. In other words, the source of the RRO errors written into a particular servo track 140, causing its shape irregularity, may not necessarily be consistent with the RRO errors written into an adjacent servo track 140, thereby making CTNR-WIRRO error the error component of the total RRO error to be addressed through RRO error correction to effectively deal with track to track mismatch and shape irregularity.

A number of CTNR-WIRRO errors written into a particular servo track 140 causes shape irregularity that differ from one track to the next, across the rotatable disc surface 106. The result in the mismatch in geometric shape between adjacent tracks and is referred to as "AC track squeeze" 142. If the geometric shape of one servo track 140 is followed during a data write operation, the data written may result in an impingement and disruption of data written on an adjacent servo track 140, thereby "squeezing" the usable width of data track 120 for writing data.

On the other hand, number of CTR-WIRRO errors written into a particular servo track 140 causes shape irregularity that substantially repeats from one track to the next, across the rotatable disc surface 106. Sources of CTR-WIRRO errors include disc slip, variation of spindle imbalance or disc flutter. CTR-WIRRO error results from synchronization of the disturbance with the rotation of the disc pack 108 during the servo write process. Presence of CTR-WIRRO errors during the servo write process results in irregularly shaped servo tracks 140 that have a substantially similar geometric shape from track to track across the rotatable disc surface 106. As such, CTR-WIRRO errors tend not to contribute to AC track squeeze 142. However, the CTNR-WIRRO errors recorded to the data track 120 during servo track write, typically associated with spindle bearing frequencies and actuator resonance frequencies, very track to track and thereby contributing directly to AC track squeeze 142.

FIG. 3 also shows a monitor 178 and station interface keyboard 180 connected to a servo station computer 182. The computer 182 controls overall station operations, provides process sequencing information, including track reference input to the servo write control electronics 168, is also used in diagnosing STW problems and communicates with an overall manufacturing control system (not shown).

Figure 4:
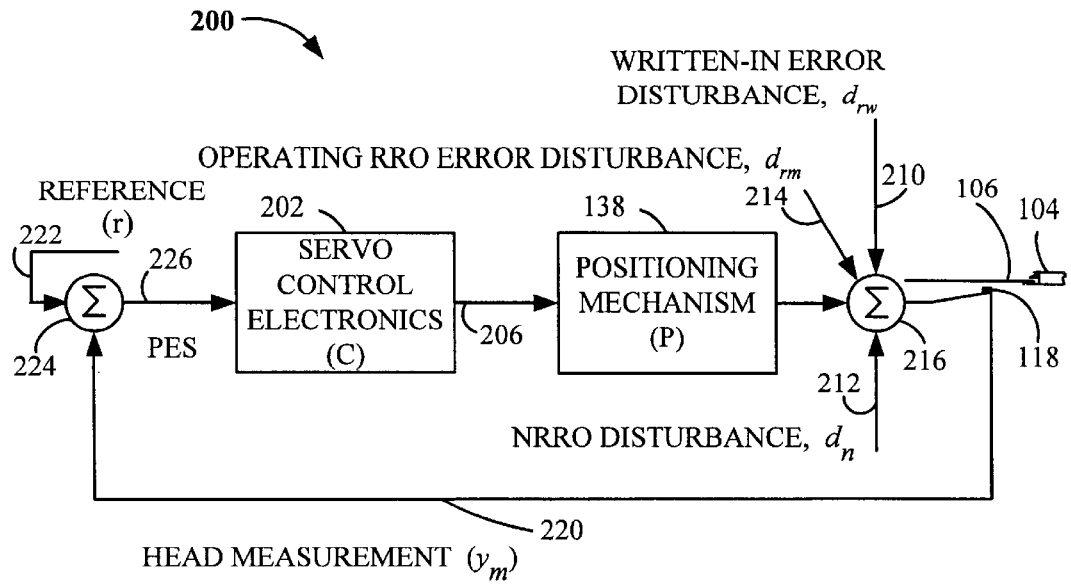
FIG. 4 is a partial simplified block diagram of the servo loop of the disc drive of FIG. 1.

FIG. 4 is a block diagram of a closed loop servo system 200 (also referred to as a control loop 200) of the disc drive 100 and is shown without compensation circuits to be discussed herein below. The servo loop 200 includes servo control electronics 202 that has a gain of "C" and the positioning mechanism 138 that has a gain of "P". Servo control electronics 202 generate a control current 206 (also referred to as a position control signal PCS 206) that drives the voice coil motor 122 of the positioning mechanism 138. In response to PCS 206, the positioning mechanism 138 produces head motion 208.

In FIG. 4, position disturbance d (not separately shown) entering the control loop 200 has been divided into three categories. The first category is written-in RRO error disturbance, $d_{rw}$, which leads to cross track non-repeatable written-in repeatable run-out error and is represented as separate input signal 210. The second is environmental noise effecting the servo system that is not written into the servo sector 144 and is a non-repeatable run-out, $d_n$, represented as separate input signal 212. The third is operating RRO error disturbance, $d_{rm}$, which leads to cross track non-repeatable written-in repeatable run-out error and is represented by separate input signal 214. Although three separate disturbances are shown as being combined at summing junction 216, each disturbance would appear implicitly in head motion 208 that constitutes head measurement signal $y_m$ 220. Read/write head 118 reading the servo sector 144 of the selected track 120 of the selected rotatable disc surface 106 transduces the head measurement signal $y_m$ 220. Separation of $d_{rw}$ 210, $d_n$ 212 and $d_{rm}$ 214 from head motion 208 in FIG. 4 has been done to provide a better understanding of the present invention. The disturbances shown as summed at summing junction 216, together with head motion 208 to produce $y_m$ 220, are combined with reference signal 222 at summing junction 224. The combination of $y_m$ 220 and reference signal 222 produces position error signal 226 (PES 226), which is input to servo control electronics 202.

The PES 226 can be divided into two components, a position error signal component resulting from repeatable or non-random disturbance, PES-RRO ($PES_r$), and a position error signal component resulting from non-repeatable or random disturbance, PES-NRRO ($PES_n$), that is:

$$PES226 = PES_r + PES_n \qquad \text{Equation 1}$$

For a selected data track 120, the repeatable portion of the PES 226, $PES_r$, can be obtained by averaging measurements of the PES 226 for several revolutionizes, that is:

$$PES_r = 1/k \sum_{i=1 \to k} (PES\ 226)^i \qquad \text{Equation 2}$$

where k is the number of revolutions included in the measurement samples. As the number of measurement samples k increases, the averaging result is closer to the real RRO portion, $PES_r$ of the PES 226, because the term $$1/k \sum_{i=1 \to k} (PES\ 226)^i$$

approaches zero as k increases in size.

Separation of position disturbance d (not separately shown) into its component parts, $d_{rw}$ 210, $d_n$ 212 and $d_{rm}$ 214, follows from an understanding that the position disturbance d is a composite of two components, repeatable disturbance ($d_r$) (not shown separately) and non-repeatable disturbances ($d_n$ 212).

The repeatable disturbance ($d_r$) is a composition of two categories, written-in error disturbance, $d_{rw}$ 210 (leading to CTNR-WIRRO errors, when occurring during the servo write process) and operating RRO error disturbance, $d_{rm}$ 214 (leading to CTR-WIRRO errors, when occurring during the servo write process). The operating RRO error disturbance, $d_{rm}$ 214, results from substantially synchronized rotational mechanical disturbances present during the time of the servo track writing process. Those mechanical disturbances include variation of spindle imbalance vibration, vibrations resulting from disc slip, and variation of disc deformation. Although written into the disc during the servo track writing process, operating RRO error disturbance, $d_{rm}$ 214 is substantially repeatable from track to track across the rotatable disc surface 106 and does not significantly contribute to track squeeze because the disturbance is synchronized with the rotation of the disc pack 108. The resulting RRO error component is designated as CTR-WIRRO errors and the portion of the PES 226 attributable to the operating RRO is designated as $PES_{rm}$.

Written-in RRO error disturbance, $d_{rw}$ 210, differs from operating RRO error disturbance, $d_{rm}$ 214. Written-in error disturbance, $d_{rw}$ 210, results from substantially non-synchronized mechanical disturbances present during the time of the servo track writing process, and emanates from sources such as spindle bearing frequencies, actuator resonances and disturbances arising from the STW 160 itself. Such non-synchronized or random disturbances differ from track to track across the rotatable disc surface 106 resulting in substantially track specific written-in error disturbance $d_{rw}$ 210 that contributes directly to track squeeze. As the written-in error disturbance $d_{rw}$ 210 occurred during the servo write process, it is written into the servo sectors 144 and once written-in, becomes a component of the total RRO error. This written-in RRO error component of the total RRO error is designated as CTR-WIRRO errors and is substantially the track specific portion of the of the total RRO. The portion of the PES 226 attributable to the track specific RRO error, or CTR-WIRRO error, is designated as $PES_{rw}$.

As the $PES_{rm}$ results from operating RRO error disturbance, $d_{rm}$ 214, its contribution to PES 226 can be obtained by averaging $PES_r$ across several data tracks 120 of rotatable disc surface 106, that is:

$$PES_{rm} = 1/n \sum_{i=1 \to n} (PES_r)^i \qquad \text{Equation 3}$$

where n is a number of tracks sampled. As the number of sampled tracks n increases, the resulting average approaches the real $PES_{rm}$.

As $PES_r$ is a composite of $PES_{rm}$ and $PES_{rw}$, that is:

$$PES_r = PES_{rm} + PES_{rw} \qquad \text{Equation 4}$$

For a selected data track 120, isolating $PES_{rm}$ from $PES_r$ obtains $PES_{rw}$, that is:

$$PES_{rw} = PES_r - PES_{rm} \qquad \text{Equation 5}$$

Further, the PES 226 can be described as:

$$PES226 = PES_{rm} + PES_{rw} + PES_n \qquad \text{Equation 6}$$

As both $PES_{rw}$ and $PES_n$ are specific for each data track 120 and random from track to track across the rotatable disc surface 106, their influence on an average PES 226 taken over a number of data tracks 120 diminishes as the number of data tracks from which the samples are taken increases. Therefore, the calculation of $PES_{rm}$ can be simplified as follows:

$$PES_{rm} = 1/n \sum_{i=1 \to n} (PES\ 226)^i \qquad \text{Equation 7}$$

where n is a number of tracks sampled.

Again, the basic method used to compensate written-in RRO error is referred to as Zero Acceleration Path (ZAP). ZAP uses a position error signal (PES) to determine the correction factors used in written-in RRO error compensation. However, the existing method to determine the written-in RRO error is insufficiently accurate, since current methods cannot separate total RRO error into its component parts CTR-WIRRO error and CTNR-WIRRO error. The large CTR-WIRRO error, or operating RRO error, is beyond capabilities of ZAP and reduces the efficiency for CTNR-WIRRO, or track specific RRO, error compensation.

However, by removing $PES_{rm}$ from the PES 226, ($PES_{rw}$ + $PES_n$) remains. Because $PES_n$ is not written into the servo sector 144, its influence on average PES 226 for a given track 120 diminishes as the number of samples of the given track 120 taking increases, therefor by averaging the PES 226 for the given track 120 obtains the total written-in error present in the given data track 120 and by removing $PES_{rm}$ prior to calculating ZAP correction factors and by substituting ($PES_{rw}$) for PES 226 in the calculation of the ZAP correction factors. Compensation for track specific cross track non-repeatable repeatable run-out error, CTNR-WIRRO error, is achieved because $PES_{rw}$ is the track specific component of the PES 226 for any given selected data track 120. $PES_{rw}$ is the result of the disc drive 100 experiencing $d_{rm}$ 214 and $PES_n$ is the result of the disc drive 100 experiencing $d_n$ 212, where $d_n$ 212 is a random disturbance, not written-in to the servo sector 144 and not detected upon subsequent reading of the servo sector 144 at which the disturbance $d_n$ 212 occurred and is therefor not correctable using ZAP correction factors.

In constructing correction factors for CTNR-WIRRO error, the fundamental principal is that the PES 226, of a selected track 120, can be divided into three components, that is:

$$PES226 = PES_{rm} + PES_{rw} + PES_n \qquad \text{Equation 6}$$

By removing $PES_{rm}$ and $PES_n$ from PES 226, the remaining $PES_{rw}$, within the PES 226, is the CTNR-WIRRO error resulting from the servo write process.

Figure 5:
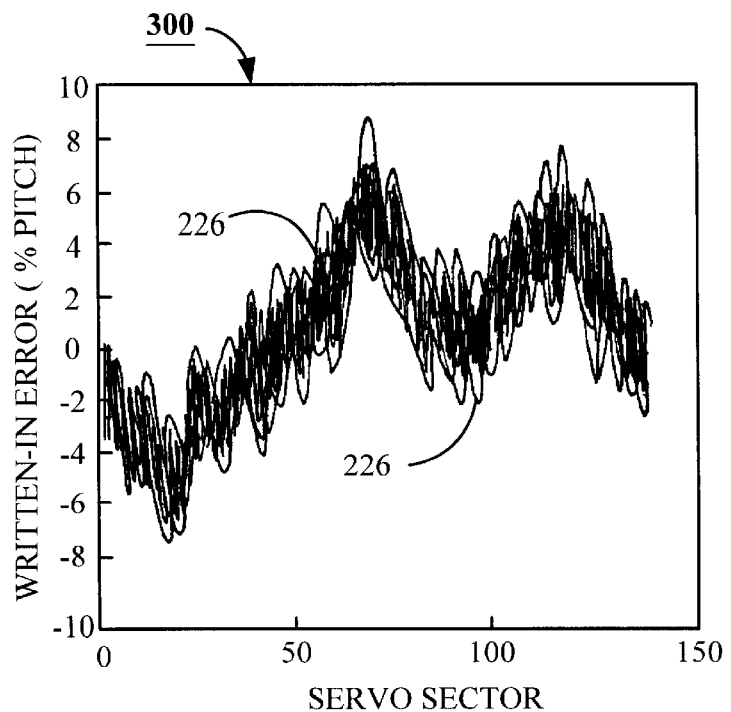
FIG. 5 is a graphical representation of the total written-in repeatable run-out error across a portion of the disc surface of the disc drive of FIG. 1.

FIG. 5 shows the total RRO error disturbance graph 300 that shows repeatable disturbance or PES 226 as a percent of track pitch, for 30 adjacent data tracks 120 and over each servo sector 144 of each data track 120. If graph 300 displayed a straight, horizontal line extending from zero across all servo sectors 144, rather than the generally consistent variable signature shown, the graph would mean that there was no significant or measurable RRO error present in the thirty data tracks 120 measured. Each of the thirty data tracks 120 would be substantially circular about a common center of rotation.

However, graph 300 shows general concentricity between the thirty data tracks 120, each having a substantially similar irregular geometric shape. In other words, although each data track 120 deviates from substantially a circle about a common center of rotation of the rotatable disc surface 106, each of the data tracks 120 follows an overall generally consistent shape. Because each track measured for position error, at any given servo sector 144, displays displacement from track center of the selected data track 120 in a consistent direction, with a substantially similar magnitude of excursion as each of the adjacent data tracks 120 at the same relative servo sector 144 of the adjacent data track 120. For this pattern to be present, the source of the disturbance causing the displacement necessarily occurred in a rotationally synchronized manner. That is, for each data track 120 the disturbance occurred at the same rotational position (meaning at common angular position from a common index) and with substantially the same amplitude and duration for each data track 120. This generally consistent concentricity of irregularly shaped data tracks 120 emanates from rotationally dependent repeatable mechanical phenomena. However, if rotationally dependent repeatable mechanical phenomena were the only disturbance present, the traces on graph 300 would be indistinguishable, lying one on top of the other, because the STW 160 would be exposed to the identical environment during the write process of each data track 120. Further, because the traces on graph 300 do not follow on an identical path, disturbances other than rotationally dependent repeatable mechanical phenomena were necessarily present during the write cycle of, and specific to, each independent data track 120 being written during the servo write process. The rotationally dependent repeatable mechanical phenomena component of the PES 226 has been classified hereinabove as CTR-WIRRO error, also known as operating RRO error, and designated as $PES_{rm}$. By removing the CTR-WIRRO error portion of the PES 226 from the PES 226, the resulting remainder is derives from disturbances not rotationally dependent, which have been classified hereinabove as CTNR-WIRRO error and designated as $PES_{rw}$.

Figure 6:
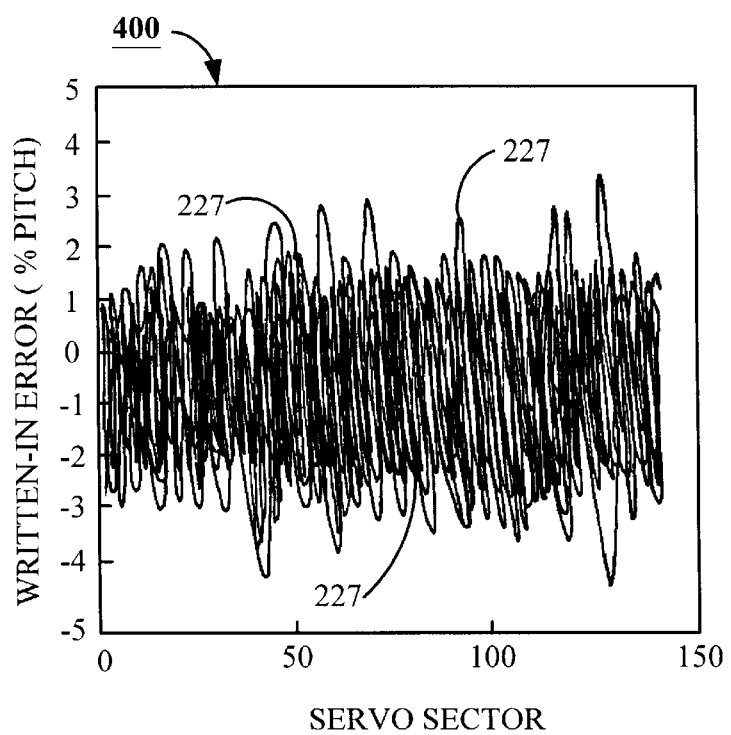
FIG. 6 is a graphical representation of a cross track non-repeatable written-in repeatable run-out error portion of the total written-in repeatable run-out error across a portion of the disc surface of the disc drive of FIG. 1.

FIG. 6 shows non-repeatable disturbance graph 400, which is the total RRO error disturbance graph 300 of FIG. 6 with the CTR-WIRRO error removed from the PES 226, leaving CTNR-WIRRO error, $PES_{rw}$ 227. Note the deviation of each of the traces for each of the thirty data tracks vary about a common center line, zero, and that the amplitude of deviation varies substantially four percent (4%) of the track pitch, in both the positive and negative direction. Note, also, the traces of graph 400 show substantially even distribution of deviation, above and below the zero line, for any particular family of measurements at any given servo sector 144 located in time the same distance from index (not shown) for each data track 120. The substantially even distribution of deviation at any given servo sector demonstrates the lack of influence from operating RRO disturbances, $d_{rm}$ 214 (of FIG. 4), and the presence of generally random disturbances that occurred during the servo write process. Removing the rotationally dependent repeatable mechanical phenomena or CTR-WIRRO error component of the PES 226, the substantially non-synchronized mechanical disturbance component, or CTNR-WIRRO error of the PES 226 of any given data track 120 can be measured, analyzed and corrected for, through the injection of an appropriate compensation signal.

Reference to FIG. 2 serves as a reminder that both track irregularity and track squeeze are issues that emanate from RRO error caused by the occurrence of disturbances during the servo write process. By referencing FIG. 5 and FIG. 6 collectively, it is clear that the CTR-WIRRO error, $PES_{rm}$, component of the PES 226 is both the prominent amplitude component of the PES 226, as well as the source of track irregularity or non-circular shape of the servo tracks 140 shown in FIG. 2.

By proceeding with conventional applications of compensation techniques, the dominance of the CTN-WIRRO error, $PES_{rm}$, substantially results in the generation of values used to construct a compensation signal that substantially resolves track irregularity for the specific selected frequencies but does little to address track squeeze. An exception to the relative absence of addressing track squeeze issues using conventional applications of compensation occurs when a CTNR-WIRRO error, $PES_{rw}$, which results from written-in error disturbance, $d_{rw}$ 210 experienced by the disc drive 100 during the servo track write process, coincides and is additive to the CTR-WIRRO error, $PES_{rm}$. The more general case is that the CTNR-WIRRO error, $PES_{rw}$, the primary source of track squeeze, is masked or dominated by the CTR-WIRRO error, $PES_{rm}$, component of the $PES_r$.

Figure 7:
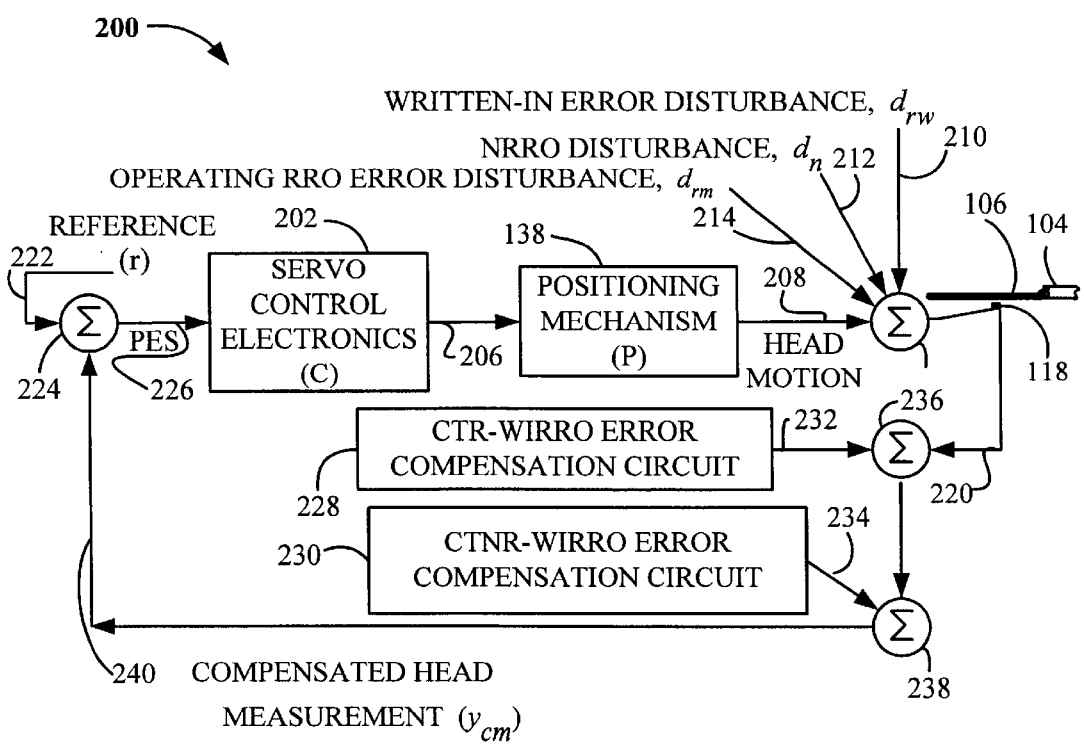
FIG. 7 is a simplified block diagram of the servo loop of the disc drive of FIG. 1 that includes an operating RRO compensation circuit and a written-in RRO compensation circuit.

As noted hereinabove, an example of a basic method used to compensate written-in RRO error is referred to as zero acceleration path method or "ZAP." Under a ZAP method of written-in RRO error compensation, disturbances measurements can be made from, and compensation signals derived for, track specific RRO by the following procedure. First, position the read/write head 118 over a data track 120 containing servo sectors 144. With the read/write head 118 in position, maintain a read element (not separately shown) of read/write head 118 stationery in relation to the data track 120. Determine the transfer function of the servo loop 200 in the disc drive at selected frequencies, such as the cage frequency of a bearing assembly of the spindle motor assembly 104. After determining the transfer function, determine a sequence of repeatable run-out values in time domain. Transform the sequence of time domain repeatable run-out values into a sequence of frequency-domain repeatable run-out values and then divide the respective frequency-domain repeatable run-out values by the measured transfer function to produce a frequency-domain sequence of compensation values. Then, inverse transform the frequency-domain sequence of compensation values to produce a sequence of time domain compensation values. Next, write the time domain compensation values into a Zero Acceleration Path table (ZAP table) (not shown) and inject the time domain sequence of compensation values into the servo control electronics 202 of the servo control loop 200 of the disc drive 100 as shown by FIG. 7.

It is noted the above method is applicable to correction of CTNP-WIRRO error, which in a preferred embodiment of the present invention is $PES_{rw}$. However, the same basic procedure can be used in determining compensation signals CTR-WIRRO error, $PES_{rm}$. This is accomplished by changing the measurement step of the process, calling for use of an equation in the form of:

$$PES_r = 1/k \sum_{i=1 \to k} (PES\ 226)^i \qquad \text{Equation 9}$$

where k is the number of revolutions used in the measurement sample, to a measurement step using an equation in the form of:

$$PES_{rm} = 1/n \sum_{i=1 \to n} (PES\ 226)^i \qquad \text{Equation 7}$$

where n is the tracks sampled.

Shown in FIG. 7 is a simplified block diagram of an implementation of a preferred embodiment of the present invention showing additions of an operating RRO compensation circuit 228 (also referred to herein as a CTR-WIRRO compensation circuit 228 or simply, a repeatable run-out error compensation circuit 228) and a written-in RRO compensation circuit 230 (also referred to herein as a CTNR-WIRRO compensation circuit 230 or simply, a non-repeatable run-out error compensation circuit 230) to the closed loop servo system 200 of FIG. 4. The elements in FIG. 7 common to elements in FIG. 4 retain the same sign number assigned the element in FIG. 4.

During operation of the disc drive, correction factors calculated for a selected data track 120 of a selected rotatable disc surface 106 are applied to the selected data track 120 in the form of a cross track repeatable compensation signal 232 (also referred to herein as compensation signal 232) through utilization of the CTR-WIRRO compensation circuit 228, and in the form of a cross track non-repeatable compensation signal 234 (also referred to herein as compensation signal 234) through utilization of CTNR-WIRRO compensation circuit 230. The cross track repeatable compensation signal 232 is inserted at summing junction 236 to compensate for the selected frequencies of CTR-WIRRO error, $PES_{rm}$, while the cross track non-repeatable compensation signal 234 is injected at summing junction 238 to compensate for CTNR-WIRRO error, $PES_{rw}$. The result of applying the compensation signals 232 and 234 to the head measurement signal ($y_m$) 220 is a compensated head measurement signal ($y_{cm}$) 240 that combines with reference signal 222 at summing junction 224 to provide a PES 226 that results in a substantially circular data track 120. Injection of compensation signals 232 and 234 into the servo control electronics 202 of the closed loop servo system 200 for track 120 of rotatable disc surface 106 results in a plurality of substantially circular, concentric data tracks 120 across the rotatable disc surface 106. However, those skilled in the art will recognize that the compensation signals 232 and 234 can be added at other locations within the servo loop 200 without deviating from the scope of the invention.

Following compensating for operating RRO error, the addition of cross track non-repeatable compensation signal 234 results in the close loop response of servo loop 200 expressed as:

$$y_t = [PC/(1+PC)]*(r-(d_{rw}+d_{rm}+d_n)-d_c) \quad \text{Equation 10}$$

where "$y_t$" is the remaining head motion, "P" is the gain of the positioning mechanism 138, "C" is the gain of the servo control electronics 202, "r" is referenced signal 222, "$d_{rw}$", is written-in RRO error disturbance that leads to cross track non-repeatable written-in repeatable run-out error and is represented as separate input signal 210, "$d_{rm}$" is operating RRO error disturbance that leads to cross track non-repeatable written-in repeatable run-out error and is represented by separate input signal 214, "$d_n$" is a non-repeatable run-out noise effecting the servo system that is not written into the servo sector 144 and is represented as separate input signal 212 and "$d_c$" is the cross track non-repeatable compensation signal 234. From equation 10, it is apparent that the effects of written-in RRO error ($d_{rw}$), will be eliminated by compensation signal, $d_c$, 234, if the compensation signal $d_c$, 234, is equal to the negative of the written-in RRO error ($d_{rw}$).

Referring back to FIG. 4, i.e., servo loop 200 absent CTR-WIRRO compensation circuit 228 and 230, has closed loop response that is calculated as:

$$y = [PC/(1+PC)]*(r-d_{rm}-(d_{rw}+d_n)) \quad \text{Equation 11}$$

where "y" is the head motion 208, "P" is the gain of the positioning mechanism 138, "C" is the gain of the servo control electronics, "r" is the reference signal 222, "$d_{rw}$", is written-in RRO error disturbance 210, "$d_{rm}$" is operating RRO error disturbance 214, "$d_n$" is a non-repeatable run-out noise effecting the servo system 212. Additionally, $PES_{rw}$ may alternatively expressed as:

$$PES_{rw} = [1/(1+PC)]*d_{rw} \quad \text{Equation 12}$$

Using equation 11, an estimation of written-in error ($d_{rw}$) can be produced by ignoring referenced signal 222 and using only the portion of PES 226 caused by CTNR-WIRRO error. This results in:

$$(d_{rw}) = -PES_{rw}/(1/[1+PC]) \quad \text{Equation 13}$$

Using equation 10 and 13 from above, an estimation of a compensation signal, $d_c$, needed to eliminate the effects of CTNR-WIRRO error, (emanating from $d_{rw}$), appears as:

$$d_c = PES_{rw}[1/(1+PC)] = -d_{rw} \quad \text{Equation 14}$$

In terms of frequencies, equation 14 can be described as:

$$d_c(j\omega) = PES_{rw}(j\omega)/[1/(1+PK)]*(J\omega) \quad \text{Equation 15}$$

The compensation signals 232 and 234 injected into the servo control electronics 202 of the closed loop servo system 200 of the present invention are time domain signals. In a preferred embodiment, the time domain signals are determined using the frequency domain relationships shown in Equation 15. The frequency domain relationships shown in Equation 15 is first applied to the CTR-WIRRO error, $PES_{rm}$, component of the PES 226 to produce values or components of the frequency-domain compensation signal, which are transformed into a time domain values or components of the cross track repeatable compensation signal 232 used to compensate CTR-WIRRO error, $PES_{rm}$. Next, the frequency domain relationships shown in Equation 15 are applied to the CTNR-WIRRO error, $PES_{rw}$, component of the PES 226 to produce values or components that form the frequency-domain compensation signal, which are transformed into time domain values or components forming the cross track non-repeatable compensation signal 234 used to compensate CTNR-WIRRO RRO error, $PES_{rw}$, which result from "$d_{rw}$", is written-in RRO error disturbance "$d_{rw}$" 210. The time domain values or components of the compensation signals 232 and 234 are stored in ZAP tables (not shown) for use in deriving and providing the compensation signals during operation of the disc drive 100.

It will be appreciated by those skilled in the art that the ZAP table values can be developed by means internal the disc drive 100 or through a combination of steps and means external to the disc drive 100. Also, the ZAP table values may be stored in a nonvolatile memory portion of the disc drive, including being written into the servo sectors or within a predetermined portion of a data sector for each of the data tracks 120. It will also be recognized by those skilled in the art that ZAP table values are typically developed and used for correction of the PESr component of the PES 226 during the process of identifying and forming data sectors (not separately shown) and during all subsequent data transfer operations but may be developed and used at other points in the manufacturing process, such as during the servo writing process, and written to or embedded within an alternate portion of the disc drive 100 such as the servo sector 144 (of FIG. 2).

It will be further recognized by those skilled in the art that isolation of the CTNR-WIRRO error, $PES_{rw}$, is useful in calculating the AC track squeeze at the drive level. Existing methods used in determining AC track squeeze generally lack the level of accuracy needed for high track density disc drives such as disc drive 100, because of the methods' inability to separate the CTNR-WIRRO error, $PES_{rw}$, from the CTR-WIRRO, $PES_{rm}$. The written-in RRO error disturbance, $d_{rw}$ can be calculated as:

$$d_{rw} = PES_{rw}(1+CP) \quad \text{Equation 16}$$

The open loop transfer function is easily measured, especially when the only selected frequency responses needed in Eq. 16, are the frequency responses at the harmonics of the spindle rotational frequency. Finally, AC track squeeze can be obtained as:

$$d_{rw} = \sqrt{\frac{1}{n}\sum_{j=1}^{n}\left(1/N\sum_{i=1}^{N}d_{rw}^{i2}\right)} \quad \text{Equation 17}$$

In an alternate preferred embodiment, a balanced approach to $PES_r$ error compensation, based on an analysis of both the PESr components, PESrm and PESrw, is applied to the disc drive 100 as a compensation signal with the CTR-WIRRO error CTR-WIRRO compensation circuit 228 and the CTNR-WIRRO compensation circuit 230 operating in tandem or as a singular PESr error compensation circuit to provide a compromised compensation signal (not separately shown) based on characteristics of the disc drive 100, given the following relationship:

Where a value selected from a first PESr error correction value table and applied to PESrm error compensation via the cross track repeatable compensation signal 232 developed through CTR-WIRRO compensation circuit 228, has a value expressed as;

$$ZAP\ table\_1 = (1+PC)PES_{rm}(CTR\text{-}WIRRO\ compensation)$$

and applied directly to the head measurement signal 220, and where a value selected from a second PESr error correction value table and applied to CTNR-WIRRO error compensation via the cross track non-repeatable compensation signal 234 developed through the CTNR-WIRRO compensation circuit 230, has a value expressed as;

$$ZAP\ table\_2 = (1+PC)PES_{rw}(CTNR\text{-}WIRRO\ compensation)$$

and applied directly to the head measurement signal 220 are applied in tandem or in parallel to the head measurement signal 220, a single combined compensation signal (not separately shown), based on a separation, analysis and determination of each of the components of $PES_r$ error, can be applied through the use of a single error compensation circuit (which could be either the CTR-WIRRO compensation circuit 228 or the CTNR-WIRRO compensation circuit 230) by determining the contributory share made to the single error compensation circuit by each of the compensation signals 232 and 234. The balanced approach to $PES_r$ error correction, combines the values and applies a single compensation signal (not shown separately) to the head measurement signal 220. In the combined or compromised error correction embodiment, a value is selected from a compromised error correction value table and applied to total PESr error compensation and can be expressed as;

$$ZAP\ table\_compromised = (1+PC)[(1-a)*PES_{rm} + a*PES_{rw}]$$

where α is a disc drive 100 selected constant between zero (0) and one (1) and determines the proportion of PESr error correction contributed by each PESr error correction component $(1+PC)\ PES_{rm}$ and $(1+PC)\ PES_{rw}$. In a preferred embodiment, α is 0.90.

Figure 8:
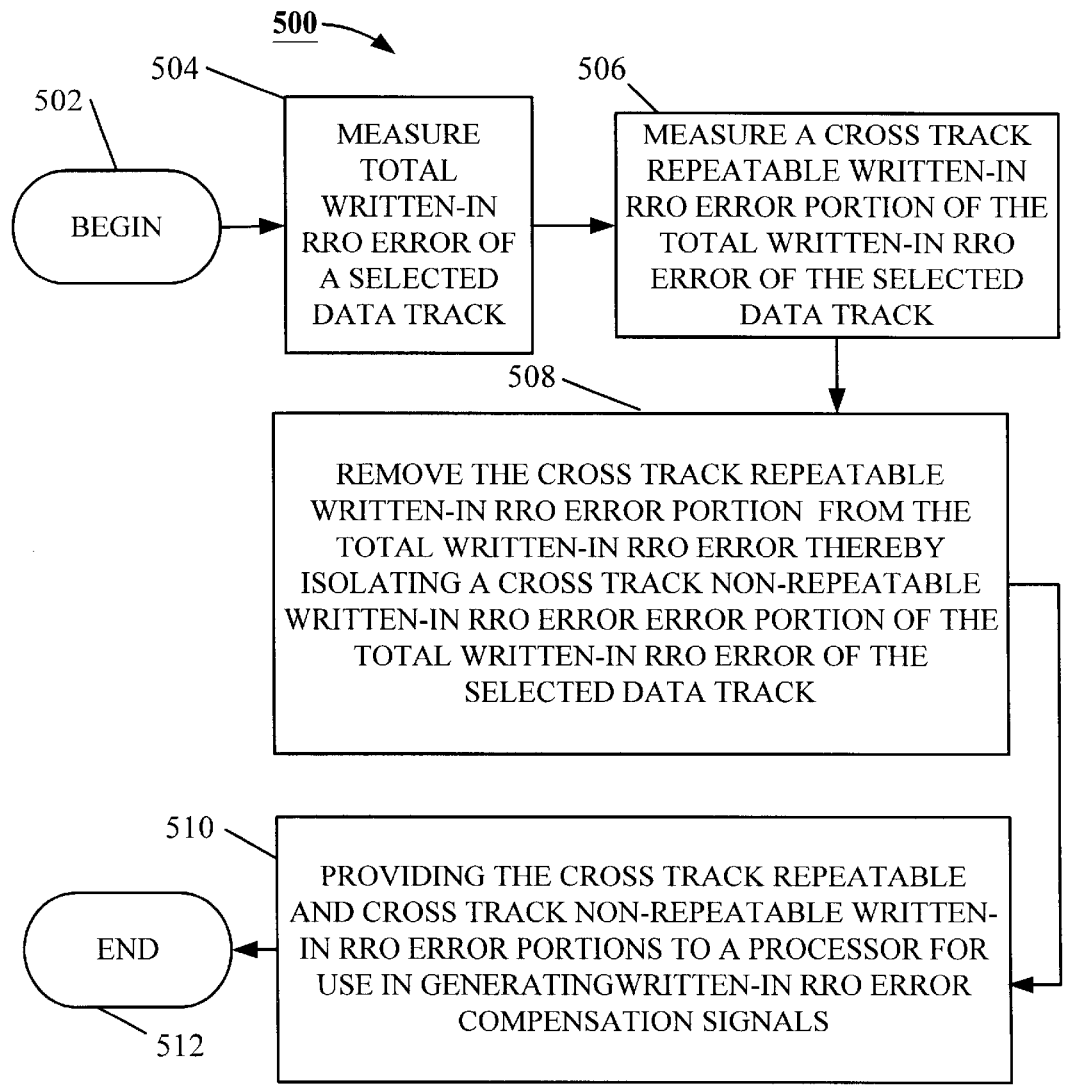
FIG. 8 is a flow diagram showing steps for isolating the cross track repeatable and cross track non-repeatable components of the total written-in repeatable run-out error of a selected data track of the disc drive of FIG. 1.

FIG. 8 shows a CTR-WIRRO and CTNR-WIRRO error isolation process 500. Keeping in mind, the total written-in repeatable run-out error includes a cross track repeatable written-in repeatable run-out error component and a cross track non-repeatable written-in repeatable run-out error component. To isolate the CTNR-WIRRO error of a selected data track, the total written-in RRO error for a selected data track 120 (of FIG. 2) is measured by averaging a multitude of position error signals for each of the servo sectors 144 (of FIG. 2) of the selected data track 120, next the CTR-WIRRO error component of the total written-in RRO error is measured by averaging a position error signals for a multitude of selected data tracks, which is then removed or separated from the total written-in repeatable run-out error leaving CTNR-WIRRO error component as the remaining portion of the total written-in RRO error (an arithmetic subtraction method of removal may be used).

The synchronous and written-in non-synchronous RRO error isolation process 500 commences at begin step 502 and continues with process step 504 where a disc drive (such as 100) is brought to operating speed and a read/write head (such as 118) of a positioning mechanisms (such as 138) is positioned over a selected data track (such as 120) by the positioning mechanism. Once positioned, the read/write head reads position information from each of a plurality of servo sectors (such as 144) written into the selected data track of a selected data surface (such as 106) while the data surface rotates beneath the read/write head. In a preferred embodiment, the number of rotations of the surface beneath the read/write head is 30. A value representing position error detected from each of the servo sectors is collected for each of the servo sectors during the 30 rotations of the disc surface. From the collected data an average position error value for each of the servo sectors is calculated. By averaging the position error over a multitude of disc rotations, random system noises entering a servo control loop (such as 200) are minimized and a close approximation of the total written-in RRO error of the selected data track is obtained. The greater the number of rotations used to collect the position error samples, the closer the resulting average is to the actual total written-in RRO error present in the selected data track.

Completing process step 504, isolation of isolation of total written-in RRO error component of the total RRO error process continues at step 506 where the CTR-WIRRO error component of the total written-in RRO error of the selected track is measured. To measure the CTR-WIRRO error component of the total written-in RRO error, the total written-in RRO error for plurality of adjacent data tracks is measured and averaged using the described process of process step 504. The resulting values for each of the servo sectors lying in radial alignment with each of the corresponding servo sectors of each of the plurality of adjacent data tracks are averaged together to generate a CTR-WIRRO error value for each of the servo sectors of each of the plurality of data tracks made party to the sample. Again, by increasing the number of data tracks included within the sample, the closer the resulting average is to the actual CTR-WIRRO error value for each of the servo sectors included in the sample. In a preferred embodiment, 30 data tracks proved sufficient.

Process step 508 is the next step in CTR-WIRRO and CTNR-WIRRO error isolation process 500. At process step 508, the CTR-WIRRO component determined for each of the servo sectors of the selected data track by process step 506 is removed from the total written-in RRO error value calculated for each of the servo sectors of the selected data track in process step 504 leaving the CTNR-WIRRO error component of the total written-in RRO value for each of the servo sectors of the selected data track.

At process step 510, both the CTR-WIRRO and CTNR-WIRRO error components of the total written-in RRO error value are provided to a processor for use in generating a CTR-WIRRO error compensation signal (such as 232) (which may be inserted at summing junction (such as 236) to compensate for the selected frequencies of CTR-WIRRO error, $PES_{rm}$) and for generating a CTNR-WIRRO error compensation signal (such as 234) (which may be injected at summing junction (such as 238) to compensate for CTNR-WIRRO error, $PEST_{rw}$) Each compensation signal may be injected into the servo control loop to compensate for track squeeze and the noncircularity of the data track's associated servo track (such as 140). CTR-WIRRO and CTNR-WIRRO error isolation process 500 concludes with end step 512.

Figure 9:
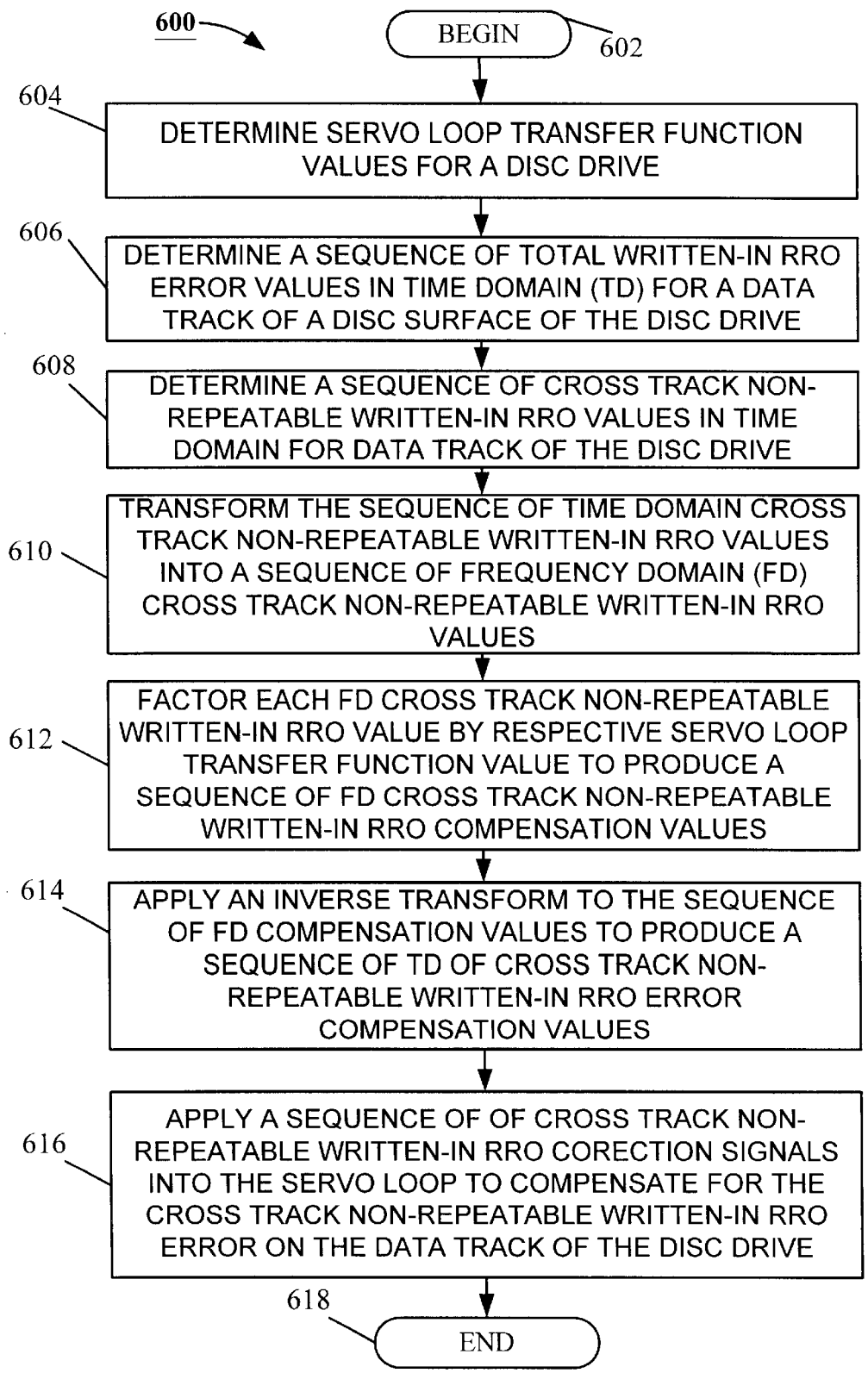
FIG. 9 is a flow diagram showing steps for injecting the sequence of time domain cross track non-repeatable written-in repeatable run-out error compensation values into the servo loop of the disc drive of FIG. 9.

FIG. 9 shows CTNR-WIRRO error compensation process 600 beginning at process step 602 and continuing to process step 604 where servo transfer function values for a disc drive (such as 100) are determined. CTNR-WIRRO error compensation process 600 continues at process step 606 where a sequence of total written-in RRO error values for each servo sector (such as 144) of a selected data track (such as 120) of a portion of a disc surface (such as 106) of the disc drive 100 are determined using a CTR-WIRRO and CTNR-WIRRO error isolation process (such as 500). It is noted that the sequence of total written-in RRO error values is within the time domain.

The next step, process step 608, a sequence of time domain CTNR-WIRRO error values for each of the servo sectors of the selected data track of the selected portion of the disc surface of the disc drive 100 are determined using CTR-WIRRO and CTNR-WIRRO error isolation process. In process step 610, each of the sequence of time domain CTNR-WIRRO error values is transformed into a frequency domain CTNR-WIRRO error value that collectively form a sequence of frequency domain CTNR-WIRRO error values. In process step 612 each of the frequency domain CTNR-WIRRO error values is divided by the respective servo loop transfer functions for the selected frequencies to produce a sequence of frequency domain CTNR-WIRRO error compensation values. Then in process step 614 application of an inverse transform is applied to the frequency domain CTNR-WIRRO error compensation values to produce a sequence of time domain CTNR-WIRRO error compensation values (such as 232) for those selected frequencies. Next, at process step 616 the time domain CTNR-WIRRO error compensation values are used to generate an error compensation signal (such as 232) which is injected into a servo loop (such as 200) to compensate for the time domain CTNR-WIRRO error component of the total written-in RRO error written into each of the servo sectors of the selected data track of the selected portion of the disc surface of the disc drive 100.

Accordingly, in a preferred embodiment, the present invention is directed to a method for isolating a total written-in repeatable run-out error into a cross track repeatable written-in repeatable run-out error component and a cross track non-repeatable written-in repeatable run-out error component, and an apparatus for compensating each. In accordance with one aspect of a preferred embodiment, steps preformed include measuring a position error signal of a data track of the disc surface to determine total written-in repeatable run-out error to the data track, step 504; isolating a cross track repeatable written-in repeatable run-out error component using measurements from a plurality of data tracks for use in isolating the cross track non-repeatable written-in repeatable run-out error component written into a servo sector of the data track, step 506; separating the cross track non-repeatable written-in repeatable run-out error component from the total written-in repeatable run-out error of the data track to isolate the cross track non-repeatable written-in repeatable run-out error component of the total written-in repeatable run-out error of the data track, step 508; and providing the isolated cross track non-repeatable and cross track repeatable written-in repeatable run-out error components of the total written-in repeatable run-out error to a processor for generation of compensation signals used in compensating the shape irregularity of the concentric data tracks of the data surface, step 510.

It is to be understood that even though numerous characteristics and advantages of various embodiments of the present invention haven't been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application of the servo system while maintaining substantially the same functionality without departing from the scope and spirit of the present invention. In addition, although the preferred embodiment described herein is directed to a servo for a disc drive system, it will be appreciated by those skilled in the art that the teachings of the present invention can be applied to other systems without departing from the scope and spirit of the present invention.

What is claimed is:

1. A method of isolating repeatable and non-repeatable error components of a total written-in repeatable run-out error of a data track of a rotatable disc surface of a disc drive for use in compensating shape irregularity of the data track comprising steps of:
   (a) determining the total written-in repeatable run-out error value component for a selected servo sector of a plurality of servo sectors of the data track;
   (b) isolating the repeatable error value component of the selected servo sector for use in determining the non-repeatable error value component;
   (c) separating the repeatable error value component from the total written-in repeatable run-out error value, to determine the non-repeatable error value component for the selected servo sector;
   (d) providing both the repeatable and non-repeatable error value components to a processor for generation of compensation signals used in compensating the total written-in repeatable run-out error value for the selected servo sector; and
   (e) compensating the shape irregularity of the data track by repeating steps (a) through (d) for each of the plurality of servo sectors of the data track of the disc drive and applying the compensation signals into a servo loop of the disc drive.

2. The method of claim 1 in which the data track of determining step (a) is one of a plurality of adjacent data tracks supported by the rotatable disc surface and in which the determining step (a) comprising steps of:
   (a1) selecting the data track from among the plurality of adjacent data tracks of the rotatable disc surface;
   (a2) measuring and storing a plurality of position error signals measurements for each of the plurality of servo sectors of the selected data track for use in calculating the total written-in repeatable run-out error value for each of the plurality of servo sectors of the selected data track;
   (a3) manipulating the plurality of stored position error signal measurements for each of the plurality of servo sectors to determine the total written-in repeatable run-out error value for each of the plurality of servo sectors; and
   (a4) storing the total written-in repeatable run-out error value for each of the plurality of servo sectors for use in isolating the repeatable error value component of the total written-in repeatable run-out error value for each of the plurality of servo sectors.

3. The method of claim 2 in which each of the plurality of servo sectors of the selected data track is adjacent one of the plurality of servo sectors of a data track adjacent the selected data track, wherein a plurality of adjacent servo sectors form a servo wedge across the rotatable disc surface and in which isolating step (b) of claim 1 comprises steps of:
   (b1) repeating the determining steps (a1) through (a4) of claim 2 for the plurality of adjacent data tracks of the rotatable disc surface; and (b2) processing the stored total written-in repeatable run-out error value components of each of the plurality of servo sectors of the servo wedge to isolate the repeatable error value component of the total written-in repeatable run-out error value for the selected servo sector.

4. The method of claim 1 in which the disc drive comprises a servo loop having servo control electronics, the data track of determining step (a) is one of a plurality of adjacent data tracks supported by the rotatable disc surface, the repeatable error value component of isolating step (b) is a time domain repeatable error value component, wherein each of the plurality of data tracks support a plurality of servo sectors, and in which the compensating step (e) comprises steps of:

(e1) determining a transfer function value for each selected frequency of the servo loop of the disc drive;

(e2) deriving the time domain repeatable error value component for each of the plurality of servo sectors of each of the plurality of adjacent data tracks;

(e3) transforming each of the time domain repeatable error value components for each of the plurality of servo sectors into a frequency domain repeatable error value component for each of the plurality of servo sectors of each of the plurality of adjacent data tracks;

(e4) factoring each of the frequency domain repeatable error value components of each of the plurality of servo sectors by the transfer function for a selected one of the selected frequencies to produce a frequency domain repeatable error compensation value for each of the plurality of servo sectors of each of the plurality of adjacent data tracks;

(e5) applying an inverse transform to each of the frequency domain repeatable error compensation values to produce a time domain repeatable error compensation value for each of the servo sectors of each of the plurality of adjacent data tracks;

(e6) storing each of the time domain repeatable error compensation values for use in generating and applying a cross track repeatable compensation signal to the servo control electronics of the servo loop to compensate for each of the time domain repeatable error value components of each of the servo sectors of each of the plurality of adjacent data tracks; and (e7) generating and applying the cross track repeatable compensation signal to the servo loop, compensating for each of the time domain repeatable error value components for each of the servo sectors of each of the plurality of adjacent data tracks.

5. The method of claim 4 in which the non-repeatable error value component of separating step (c) of claim 1 is a time domain non-repeatable error value component, and in which the compensating step (e) further comprising steps of:

(e8) determining the non-repeatable error value component for each of the plurality of servo sectors of each of the plurality of adjacent data tracks;

(e9) transforming each of the time domain non-repeatable error value components for each of the plurality of servo sectors into a frequency domain non-repeatable error value component for each of the plurality of servo sectors of each of the plurality of adjacent data tracks;

(e10) factoring each of the frequency domain non-repeatable error value components of each of the plurality of servo sectors by the transfer function for a selected one of the selected frequencies to produce a frequency domain non-repeatable error compensation value for each of the plurality of servo sectors of each of the plurality of adjacent data tracks;

(e11) applying an inverse transform to each of the frequency domain non-repeatable error compensation values to produce a time domain non-repeatable error compensation value for each of the servo sectors of each of the plurality of adjacent data tracks;

(e12) storing each of the time domain non-repeatable error compensation values for use in generating and applying a cross track non-repeatable compensation signal to the servo loop to compensate for each of the time domain non-repeatable error value components for each of the servo sectors of each of the plurality of adjacent data tracks; and (e13) generating and applying the cross track non-repeatable compensation signal to the servo loop compensating for each of the time domain non-repeatable error value components for each of the servo sectors of each of the plurality of adjacent data tracks.

6. The method of claim 1 in which the compensation signals of providing step (d) are a combined compromised error compensation signal having a predetermined cross track repeatable compensation signal portion and a cross track non-repeatable compensation signal portion.

7. The method of claim 6 in which the cross track non-repeatable compensation signal portion of the combined compromised error compensation signal is greater than the cross track repeatable compensation signal portion of the combined compromised error compensation signal of providing step (d).

8. The method of claim 6 in which the cross track non-repeatable compensation signal portion of the combined compromised error compensation signal is less than the cross track repeatable compensation signal portion of the combined compromised error compensation signal of providing step (d).

9. A disc drive having a rotatable disc surface, a read/write head positionably adjacent the rotatable disc surface and a servo loop for positioning the read/write head relative to a rotatable disc surface, the servo loop comprising:

a servo track with a plurality of servo sectors supported by the rotatable disc surface for providing servo control information;

a read element of the read/write head for reading the servo control information from the plurality of servo sectors of the servo track and producing a head measurement signal;

a reference signal for combining with the head measurement signal to produce the position error signal;

a servo control circuit for generating a position control signal in response to the servo position error signal;

a positioning mechanism communicating with the servo control circuit for moving the read/write head relative to the rotatable disc surface in response to the position control signal;

a repeatable run-out error compensation circuit for generating and applying an initial cross track repeatable compensation signal to the head measurement signal; and a non-repeatable run-out error compensation circuit for generating and applying an initial cross track non-repeatable compensation signal to the head measurement signal.

10. The disc drive of claim 9 in which the positioning mechanism comprises:

a head stack assembly having a bearing assembly communicating with at least one actuator arm supporting a load arm that supports at least one read/write head; and a voice coil motor having an actuator coil immersed in a magnetic field generated by a magnet assembly having a permanent magnet secured between a bottom pole piece and a top pole piece forming a magnetically permeable flux path communicating with the servo control circuit, the actuator coil responsive to the position control signal for positioning the read/write head relative to the rotatable disc surface.

11. The disc drive of claim 9 in which the rotatable disc surface has a plurality of generally concentric portions supporting a plurality of adjacent servo tracks each with a plurality of servo sectors, the plurality of adjacent servo tracks adjacent the servo track and in which the initial cross track repeatable compensation signal is provided by steps comprising:

(a) determining transfer function values for the servo loop of the disc drive at select frequencies;

(b) deriving a time domain repeatable error value component for each of the plurality of servo sectors of each of the plurality of adjacent servo tracks;

(c) transforming each of the time domain repeatable error value components for each of the plurality of servo sectors into a frequency domain repeatable error value component for each of the plurality of servo sectors of each of the plurality of adjacent servo tracks;

(d) factoring each of the frequency domain repeatable error value components of each of the plurality of servo sectors by the transfer function for a selected one of the select frequencies to produce a frequency domain repeatable error compensation value for each of the plurality of servo sectors of each of the plurality of adjacent servo tracks;

(e) applying an inverse transform to each of the frequency domain repeatable error compensation values to produce a time domain repeatable error compensation value for each of the servo sectors of each of the plurality of adjacent servo tracks;

(f) storing each of the time domain repeatable error compensation values for use in generating the initial cross track repeatable compensation signal for application to the servo control circuit of the servo loop to compensate for each of the time domain repeatable error value components of each of the servo sectors of each of the plurality of adjacent servo tracks; and (g) generating the initial cross track repeatable compensation signal to compensate for each of the time domain repeatable error value components for each of the servo sectors of each of the plurality of adjacent servo tracks.

12. The disc drive of claim 9 in which the rotatable disc surface has a plurality of generally concentric portions supporting a plurality of adjacent servo tracks each with a plurality of servo sectors, the plurality of adjacent servo tracks adjacent the servo track and in which the initial cross track non-repeatable compensation signal is provided by steps comprising:

(a) determining transfer function values for the servo loop of the disc drive at select frequencies;

(b) obtaining a total time domain written-in repeatable run-out error value for each of the plurality of servo sectors of each of the plurality of adjacent servo tracks;

(c) deriving a time domain repeatable run-out error value for each of the plurality of servo sectors of each of the plurality of adjacent servo tracks;

(d) factoring the total time domain written-in repeatable run-out error value by the time domain repeatable run-out error value for each of the plurality of servo sectors of each of the plurality of adjacent servo tracks to isolate a time domain non-repeatable error value for each of the plurality of servo sectors of each of the plurality of adjacent servo tracks;

(e) transforming each of the time domain non-repeatable error value components for each of the plurality of servo sectors into a frequency domain non-repeatable error value component for each of the plurality of servo sectors of each of the plurality of adjacent servo tracks;

(f) factoring each of the frequency domain non-repeatable error value components of each of the plurality of servo sectors by the transfer function for a selected one of the select frequencies to produce a frequency domain non-repeatable error compensation value for each of the plurality of servo sectors of each of the plurality of adjacent servo tracks;

(g) applying an inverse transform to each of the frequency domain non-repeatable error compensation values to produce a time domain non-repeatable error compensation value for each of the servo sectors of each of the plurality of adjacent servo tracks;

(h) storing each of the time domain non-repeatable error compensation values for use in generating the initial cross track non-repeatable compensation signal for application to the servo control circuit of the servo loop to compensate for each of the time domain non-repeatable error value components of each of the servo sectors of each of the plurality of adjacent servo tracks; and (i) generating the initial cross track non-repeatable compensation signal to compensate for each of the time domain non-repeatable error value components for each of the servo sectors of each of the plurality of adjacent servo tracks.

13. A disc drive having a rotatable disc surface supporting a plurality of adjacent data tracks, a read/write head positionably adjacent the plurality of adjacent data tracks, a servo loop comprising a repeatable run-out error compensation circuit, a non-repeatable run-out error compensation circuit and servo control electronics for positioning the read/write head relative to the plurality of adjacent data tracks, each data track built by steps comprising:

steps for isolating a repeatable error value component and a non-repeatable error value component of a total repeatable written-in repeatable run-out error value written into the rotatable disc surface of the disc drive;

steps for applying an initial cross track repeatable compensation signal to the servo control electronics to correct for the repeatable error value component of a total repeatable written-in repeatable run-out error value; and steps for applying an initial cross track non-repeatable compensation signal to the servo control electronics to correct for the non-repeatable error value component of a total repeatable written-in repeatable run-out error value.

14. The disc drive of claim 13 in which each of the plurality of adjacent data tracks provide a plurality of servo sectors each adjacent a respective servo sector of the adjacent data tracks, a plurality of adjacent servo sectors forming a servo wedge, the total repeatable written-in repeatable run-out error value is written into each of the plurality of servo sectors and in which the step for isolating the repeatable and the non-repeatable error value components of the total repeatable written-in repeatable run-out error value written into the rotatable disc surface of the disc drive comprises steps of:

(a) selecting a data track from among the plurality of adjacent data tracks of the rotatable disc surface;

(b) measuring and storing a plurality of position error signals measurements for each servo sector of the plurality of servo sectors for use in calculating the total repeatable written-in repeatable run-out error value written into each servo sector of the selected data track;

(c) normalizing the plurality of stored position error signal measurements for each servo sector of the plurality of servo sectors to determine the total repeatable written-in repeatable run-out error value for each servo sector of the selected data track;

(d) storing the total repeatable written-in repeatable run-out error value for each servo sector for use in isolating the repeatable error value component of the total repeatable written-in repeatable run-out error value for each servo sector of the selected data track;

(e) repeating the above steps (a) through (d) for the plurality of adjacent data tracks selected from the rotatable disc surface;

(f) standardizing the stored total repeatable written-in repeatable run-out error value for each servo sector of each of the plurality of adjacent data tracks to isolate the repeatable error value component of the total repeatable written-in repeatable run-out error value for each servo sector of each of the plurality of adjacent data tracks; and (g) removing the isolated repeatable error value component from the total repeatable written-in repeatable run-out error value for each servo sector of each of the plurality of adjacent data tracks, to provide a non-repeatable run-out error value component from the total repeatable written-in repeatable run-out error value for each servo sector of each of the plurality of adjacent data tracks.

15. The disc drive of claim 13 in which the repeatable error value component is a time domain repeatable run-out error value component, each of the plurality of adjacent data tracks support a plurality of servo sectors, and in which the steps for applying an initial cross track repeatable compensation signal to the servo control electronics comprising steps of:

(a) determining transfer function values for the servo loop of the disc drive at select frequencies;

(b) deriving a time domain repeatable error value component for each of the plurality of servo sectors of each of the plurality of adjacent data tracks;

(c) transforming each of the time domain repeatable error value components for each of the plurality of servo sectors into a frequency domain repeatable error value component for each of the plurality of servo sectors of each of the plurality of adjacent data tracks;

(d) factoring each of the frequency domain repeatable error value components of each of the plurality of servo sectors by the transfer function for a selected one of the select frequencies to produce a frequency domain repeatable error compensation value for each of the plurality of servo sectors of each of the plurality of adjacent data tracks;

(e) applying an inverse transform to each of the frequency domain repeatable error compensation values to produce a time domain repeatable error compensation value for each of the servo sectors of each of the plurality of adjacent data tracks;

(f) storing each of the time domain repeatable error compensation values for use in generating the initial cross track repeatable compensation signal for application to the servo control circuit of the servo loop to compensate for each of the time domain repeatable error value components of each of the servo sectors of each of the plurality of adjacent data tracks; and (g) generating and applying the initial cross track repeatable compensation signal to compensate for each of the time domain repeatable error value components for each of the servo sectors of each of the plurality of adjacent data tracks.

16. The disc drive of claim 13 in which the non-repeatable error value component is a time domain non-repeatable run-out error value component, each of the plurality of adjacent data tracks support a plurality of servo sectors, and in which the steps for applying an initial cross track non-repeatable compensation signal to the servo control electronics comprising steps of:

(a) determining transfer function values for the servo loop of the disc drive at select frequencies;

(b) obtaining a total time domain written-in repeatable run-out error value for each of the plurality of servo sectors of each of the plurality of adjacent data tracks;

(c) deriving a time domain repeatable run-out error value for each of the plurality of servo sectors of each of the plurality of adjacent data tracks;

(d) factoring the total time domain written-in repeatable run-out error value by the time domain repeatable run-out error value for each of the plurality of servo sectors of each of the plurality of adjacent data tracks to isolate a time domain non-repeatable error value for each of the plurality of servo sectors of each of the plurality of adjacent data tracks;

(e) transforming each of the time domain non-repeatable error value components for each of the plurality of servo sectors into a frequency domain non-repeatable error value component for each of the plurality of servo sectors of each of the plurality of adjacent data tracks;

(f) factoring each of the frequency domain non-repeatable error value components of each of the plurality of servo sectors by the transfer function for a selected one of the select frequencies to produce a frequency domain non-repeatable error compensation value for each of the plurality of servo sectors of each of the plurality of adjacent data tracks;

(g) applying an inverse transform to each of the frequency domain non-repeatable error compensation values to produce a time domain non-repeatable error compensation value for each of the servo sectors of each of the plurality of adjacent data tracks;

(h) storing each of the time domain non-repeatable error compensation values for use in generating the initial cross track non-repeatable compensation signal for application to the servo control electronics of the servo loop to compensate for each of the time domain non-repeatable error value components of each of the servo sectors of each of the plurality of adjacent data tracks; and (i) generating and applying the initial cross track non-repeatable compensation signal to compensate for each of the time domain non-repeatable error value components for each of the servo sectors of each of the plurality of adjacent data tracks.

* * * * *